United States Patent Office 3,520,975
Patented July 21, 1970

3,520,975
ANOREXIGENIC COMPOSITIONS COMPRISING FENFLURAMINE AND SCOPOLAMINE
Reevis Stancil Alphin and John Paul Da Vanzo, Richmond, Va., assignors to A. H. Robins Company, Incorporated, Richmond, Va., a corporation of Virginia
Filed Nov. 27, 1967, Ser. No. 685,985
Int. Cl. A61k 27/00
U.S. Cl. 424—265     4 Claims

ABSTRACT OF THE DISCLOSURE

Novel anorexigenic compositions comprising fenfluramine [N - ethyl - 1-(m-trifluormethylphenyl)-isopropylamine], d-amphetamine and scopolamine are described. The anorexigenic properties of fenfluramine and d-amphetamine are potentiated by scopolamine.

---

Figure 1:
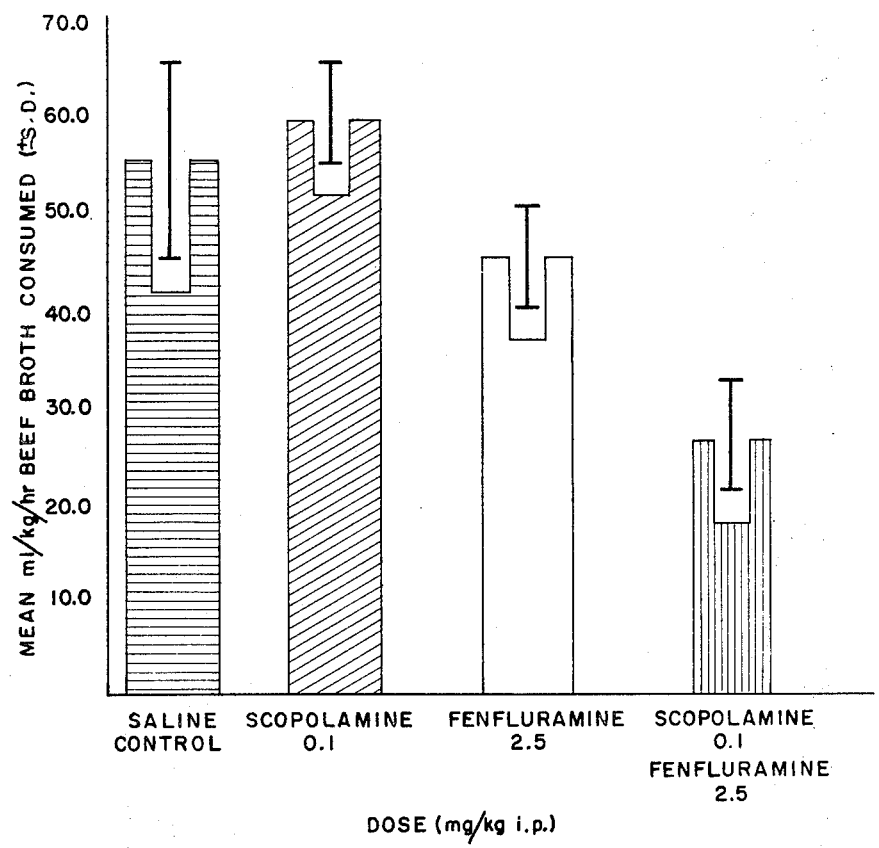
Figure 2:
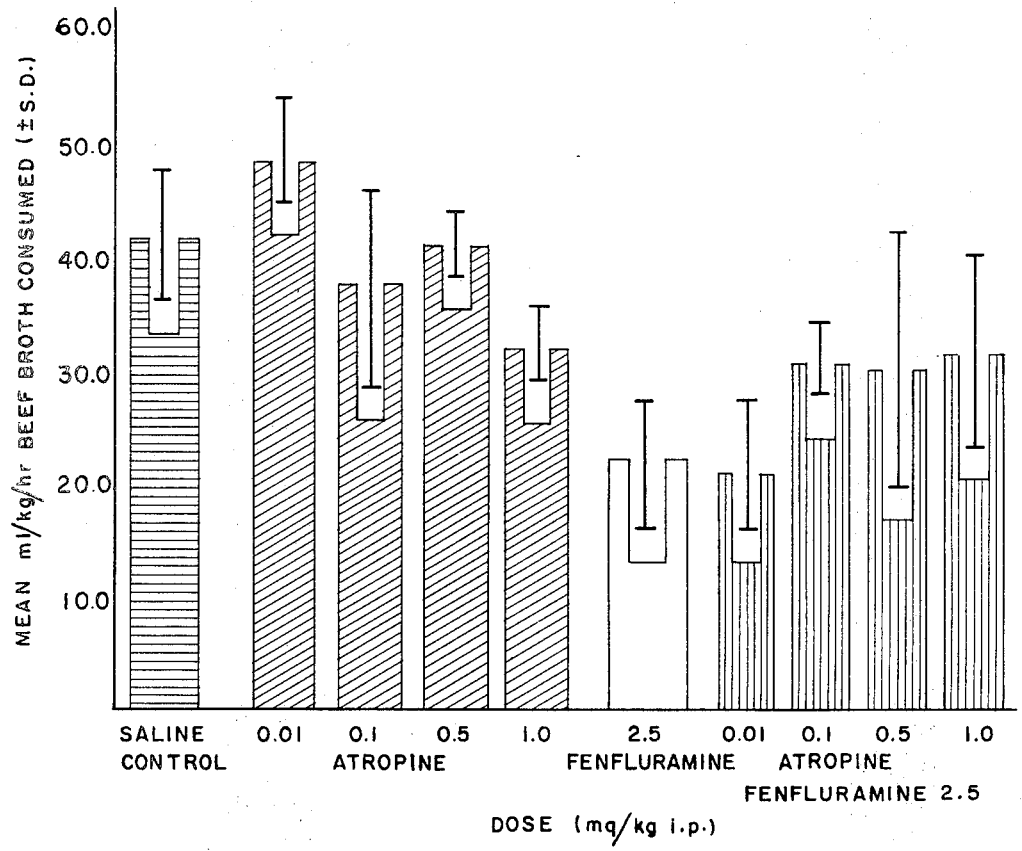

The present invention relates to novel therapeutic compositions and more particularly to oral anorexigenic compositions and a process for producing anorexia by the oral administration thereof.

Anorexigenic compositions which are also referred to as appetite satient compositions and are used for the management of obesity are well known in the art and can be broadly classified into two groups. One group is comprised of compounds which are central nervous system stimulants and the other group is comprised of compounds which have little or no effect on stimulating the central nervous system.

The most widely used agent for the management of obese conditions is d-amphetamine, a central nervous system stimulant. However, undesirable side effects are associated with the use of d-amphetamine, including, for example, various degrees of nervous tension, headache, temporary exhilaration and insomnia, as well as undesirable effects on blood pressure and cardiac rhythm. Some of the aforementioned side effects can be ameliorated by employing in combination with d-amphetamine various agents, as, for example, a barbituate such as phenobarbital or amylbarbital, or a tranquilizing agent.

A non-central nervous stimulating agent which has been found to possess excellent anorexigenic properties is fenfluramine, N - ethyl-1-(m-trifluoromethylphenyl)-isopropylamine. Fenfluramine does not have the serious side effects of d-amphetamine and has a satisfactory range between the effective and toxic doses. In addition, it does not appear to produce untoward cardiovascular reactions and is therefore useful as an anorexigenic agent in treating obese individuals suffering from various cardiac disorders.

According to the present invention it has been found that d-amphetamine and fenfluramine are potentiated when combined with scopolamine and the appetite satient effects thereof of the respective agents are markedly increased by employing such combinations. The potentiation of d-amphetamine permits reduced unit dosage with expected concomitant reduction of side effects associated therewith.

It is therefore an object of the present invention to provide (a) novel anorexigenic compositions, and in particular to provide appetite suppressant compositions containing one or more amines having anorexigenic activity in combination with scopolamine, and (b) a method of treating living animals with known anorexigenic agents, but in smaller doses and yet achieve the same or better results than have been previously acheived. A further object is to provide novel compositions for appetite control which does not require the use of central nervous system inhibitors. Additional objects will be apparent hereinafter to one skilled in the art, from the following description of the best mode of carrying out the present invention, and examples thereof, and the appended claims.

The following examples will illustrate in detail the anorexigenic activity of the novel inventive compositions of the present invention as well as procedures for preparing a number of representative dosage unit forms thereof.

EXAMPLE 1

Female rats weighing 250 to 300 grams were placed in individual cages and were provided with food and water. The experiments were run using fifteen rats in each experiment. Four experiments involving 60 rats were run. Each rat was given 2.5 mg./kg. of fenfluramine hydrochloride by intraperitoneal injection. Thirty minutes after drug administration a beef broth extract which the rats preferred to their regular diet was offered in calibrated tubes, inverted and clamped to the individual cages with a stainless steel sipper tube in a rubber stopper. The broth was offered for a one hour period and the quantity of the extract consumed was determined and calculated on a ml./kg. body weight basis. The probability values were calculated by the use of analysis of variance procedure (G. W. Snedecor, Statistical Methods, 5th edition, 1956). The rats showed a significant ($P<0.05$) decrease in broth consumption ($45.1\pm5.7$ ml./kg./hr.) when compared to the control group described in Example 3.

EXAMPLE 2

The procedure described in Example 1 was carried out using fifteen female rats weighing 250 to 300 grams. Four experiments were run involving a total of 60 rats. Each rat was given intraperitoneally the inventive composition containing fenfluramine hydrochloride (2.5 mg./kg.) and scopolamine hydrobromide (0.1 mg./kg.). The fenfluramine hydrochloride dose of 2.5 mg./kg. was approximately an $ED_{25}$ dose. The rats showed a marked decrease ($26.2\pm7.4$ ml./kg./hr.) in broth consumption when compared with the results obtained with fenfluramine in Example 1. The beef broth extract consumption was significantly less ($P<0.001$) than Example 1.

EXAMPLE 3

The procedure of Example 1 was run using a saline control. The volume of saline injected intraperitoneally was identical to the volume of the compositions administered in Examples 1 and 2. Eleven controls suing fifteen rats per control for a total of 165 rats were run. The rats were females weighing 250–300 grams. The mean broth consumption of the saline control was $55.3\pm10.6$ ml./kg./hr.

The results obtained in Examples 1–3 are shown graphically in FIG. I.

The results show that the inventive composition of fenfluramine hydrochloride and scopolamine hydrobromide was far superior in reducing the consumption of beef broth extract in non-fasted rats than fenfluramine alone. The anorexigenic effects of the inventive composition was more than additive and indicates that scopolamine potentiated and anorexigenic properties of fenfluramine.

EXAMPLE 4

Four groups of female rats weighing 250 to 300 grams, each group containing fifteen rats so that the total number of rats varied from 30 to 60 rats per group were injected intraperitoneally with 0.01, 0.1, 0.5 and 1.0 mg./kg. atropine sulfate. The beef broth extract consumption was $48.9\pm4.0$, $38.8\pm7.1$, $40.5\pm3.2$ and $33.9\pm1.7$ ml./kg./hr.

EXAMPLE 5

Sixty female rats weighing 250 to 300 grams in groups of fifteen were administered intraperitoneally 2.5 mg./kg. of fenfluramine and the experiments conducted as described in Example 1. The beef broth extract consumption was 21.9±4.9 ml./kg./hr.

EXAMPLE 6

One hundred and eighty female rats in groups of fifteen weighing 250–300 grams were injected intraperitoneally with compositions containing fenfluramine hydrochloride (2.5 mg./kg.) and atropine sulfate (0.01, 0.10, 0.50 and 1.00 mg./kg.). The beef broth extract consumption was 21.2±5.7, 33.8±2.8, 29.5±12.7 and 31.2±13.3 ml./kg./hr. None of the combination doses produced significantly more anorexigenic activity than did the results of fenfluramine alone as shown in Example 5.

EXAMPLE 7

The saline control group for Examples 4–6 had 105 female rats weighing 250 to 300 grams. The experiment was run as described in Example 3 with a beef broth extract consumption of 42.4±4.9 ml./kg./hr.

The results of Examples 4–7 are shown graphically in FIG. II.

EXAMPLE 8

A series of experiments were run as described in the preceding examples using d-amphetamine hydrochloride and scopolamine hydrobromide. Female rats weighing 250 to 300 grams were used. The results are summarized in Table I.

TABLE I.—BEEF BROTH EXTRACT CONSUMED (ml./kg./hr.)

| Group | Saline control | Scopolamine HBr, 0.5 mg./kg. i.p. | d-Amphetamine HCl, 1.0 mg./kg. i.p. | d-Amphetamine HCl, 1.0 mg./kg. i.p.+ scopolamine HBr, 0.5 mg./kg. i.p. |
|---|---|---|---|---|
| I | 48.8 | 48.8 | 46.6 | 18.1 |
|   |      | 36.4 | 56.6 | 20.1 |
|   |      | 37.9 | 48.4 |      |
| P-Values |  | >0.2 | >0.5 | <0.001 |
| II | 66.7 | 58.2 | 39.0 | 21.8 |
|   |      | 37.5 | 50.2 | 24.3 |
|   |      | 50.4 | 46.1 |      |
| P-Values |  | <0.001 | <0.001 | <0.001 |
| III | 51.1 | 40.2 | 23.3 | 14.4 |
|   |      | 32.6 | 32.7 | 16.2 |
|   |      | 40.1 | 25.5 |      |
| P-Values |  | <0.01 | <0.001 | <0.001 |

Anorexigenic pharmaceutical preparations are conveniently and easily produced by combining scopolamine, d-amphetamine, and fenfluramine with fillers, carriers, extenders and excipients such as are generally used in the preparation of pharmaceutical products which are to be taken orally or given parenterally, and which are collectively referred to herein and in the claims simply as a pharmaceutical carrier. The scopolamine or anorexic agent or agents employed may be used in the form of the free base, or preferably as the salts of acids which are water-soluble and non-toxic, such as the hydrochloride, hydrobromide, sulfate and the like. The inventive compositions may be compounded as tablets, powders, capsules, suspensions and similar dosage forms. In such form the composition may be prepared by mixing the inventive compositions preferably in the form of the water-soluble nontoxic salt, with such common diluent or tableting adjuncts as cellulose powder, cornstarch, lactose, talc, stearic acid, magnesium stearate, gums and the like, in accordance with conventional manufacturing practices common in the art.

Where the product is to be administered parenterally, the inventive compositions, preferably in the form of their nontoxic water-soluble salts, may be associated with such carriers as water, saline solution, glucose solution and the like.

A suitable dosage unit of the inventive composition for oral administration is from about 10–100 mg., preferably 20.0 mg. to 40.0 mg. of fenfluramine hydrochloride and from about 0.1 mg. to 6.0 mg. preferably ½ to 2 mg. of scopolamine hydrobromide per tablet, capsule or other dosage form.

Dosages as described above may be administered as frequently as conditions demand, and it is understood, of course, that the exact individual dosages as well as daily dosages in a particular case will be determined according to established medical principals under the direction of a physician or veterinarian.

Examples of compositions within the preferred ranges given are as follows:

EXAMPLE 9

A pharmaceutical composition for capsules is prepared using the indicated ingredients and capsulation procedure.

|  | Mg./capsule |
|---|---|
| (1) Fenfluramine hydrochloride | 25.0 |
| (2) Scopolamine hydrobromide | 1.0 |
| (3) Lactose | 146.0 |
| (4) Magnesium stearate | 4.0 |

Procedure:

(1) Blend 1, 2, 3 and 4.
(2) Mill the blend and blend again.
(3) The milled blend is filled into No. 1 hard gelatin capsules.

EXAMPLE 10

A pharmaceutical composition for tablets is prepared using the indicated ingredients and tableting procedure:

|  | Mg./tablet |
|---|---|
| (1) Fenfluramine hydrochloride | 25.0 |
| (2) Scopolamine hydrobromide | 1.0 |
| (3) Alginic acid | 20.0 |
| (4) Sodium alginate | 20.0 |
| (5) Corn starch | 20.0 |
| (6) Magnesium stearate | 1.3 |

Procedure:

(1) Blend 1, 2, 3, 4 and 5.
(2) Add sufficient water portionwise to the blend from step 1 with careful stirring after each addition. Such additions of water and stirring continue until the mass is of a consistency to permit its conversion to wet granules.
(3) The wet mass is converted to granules by passing it through the oscillating granulator, using 8-mesh screen.
(4) The wet granules are then dried in an oven at 140° F.
(5) The dried granules are then passed through an oscillating granulator, using a 10-mesh screen.
(6) Lubricate the granules with 0.5% magnesium stearate.
(7) The lubricated granules are compressed on a suitable tablet press.

EXAMPLE 11

For parenteral administration a sterile solution is prepared as follows:

|  | Mg./ml. |
|---|---|
| (1) Fenfluramine hydrochloride | 25.0 |
| (2) Scopolamine hydrobromide | 1.0 |
| (3) Isotonic buffer solution, pH 4.0 | q.s. to 2.0 ml. |

Procedure:

(1) Dissolve the active ingredient in the buffer solution.
(2) Aseptically filter the solution from Step 1.
(3) The sterile solution is now aseptically filled with sterile ampules.
(4) The ampules are sealed under aseptic conditions.

EXAMPLE 12

Pharmaceutical compositions employing d-amphetamine sulfate and scopolamine hydrobromide are prepared as described in Examples 9–11. In each example 5.0 mg. of d-amphetamine sulfate and 0.1 mg. of scopolamine hydrobromide per capsule, tablet and sterile solution is used.

A suitable range is from 2.0 to 10.0 mg. of d-amphetamine and 0.1 to 0.5 mg. of scopolamine. When desired fenfluramine and d-amphetamine may be combined and employed with scopolamine in proportion to the ranges and amounts specified above.

d-Amphetamine and fenfluramine are known, thoroughly clinically tested, and presently marketed for their anorexigenic effect. The data given above indicates that scopolamine potentiates this effect, and is indicative of the usefulness of the combinations claimed herein in human beings as well as lower animals. It will be clearly understood, however, that the distribution and marketing of any composition falling within the scope of the present invention must be predicated upon prior approval by governmental agencies such as the Federal Food and Drug Administration, which are responsible for and authorized to pass judgment on such questions.

What is claimed is:

1. An anorexigenic composition comprising (a) 2.5 mg. of fenfluramine hydrochloride and 0.1 mg. of scopolamine hydrobromide, and (b) a pharmaceutical carrier therefor.

2. An anorexigenic composition comprising (a) in unit dosage form 2.5 mg. of fenfluramine hydrochloride and 0.1 mg. of scopolamine hydrobromide, and (b) a pharmaceutical carrier therefor.

3. A process of producing anorexia in warm blooded animals which comprises administering to said animals an effective amount of a composition as defined in claim 1.

4. A process of producing anorexia in warm blooded animals which comprises administering to said animals an effective amount of a composition as defined in claim 2.

References Cited

UNITED STATES PATENTS 3,074,847   1/1963   Bigsby _____ 424—265

OTHER REFERENCES

Chem. Abst., 65, p. 4472 (1966).
Chem. Abst., 63, p. 3499 (1965).
Grollman, Pharmacology and Therapeutics, 6th ed. (1965), pp. 319–324.

ALBERT T. MEYERS, Primary Examiner

S. J. FRIEDMAN, Assistant Examiner

U.S. Cl. X.R.

424—330